(12) United States Patent
Nie et al.

(10) Patent No.: US 12,176,119 B1
(45) Date of Patent: Dec. 24, 2024

(54) INTEGRATED RAPID TREATMENT SYSTEM FOR NUCLEAR MEDICAL RADIOACTIVE WASTEWATER AND APPLICATION METHOD THEREOF

(71) Applicant: Southwest University of Science and Technology, Mianyang (CN)

(72) Inventors: Xiaoqin Nie, Mianyang (CN); Cheng Liu, Mianyang (CN); Faqin Dong, Mianyang (CN); Ning Pan, Mianyang (CN); Qiuhong Zhu, Mianyang (CN); Chunyan Ma, Mianyang (CN); Chang Liu, Mianyang (CN); Junling Wang, Mianyang (CN); Zhihui Liao, Mianyang (CN); Jiale Liu, Mianyang (CN)

(73) Assignee: Southwest University of Science and Technology, Mianyang (CN)

( * ) Notice: Subject to any disclaimer, the term of this patent is extended or adjusted under 35 U.S.C. 154(b) by 0 days.

(21) Appl. No.: 18/805,922

(22) Filed: Aug. 15, 2024

(30) Foreign Application Priority Data

Aug. 16, 2023 (CN) .......................... 202311036067.6

(51) Int. Cl.
*G21F 9/12* (2006.01)
*B01D 59/00* (2006.01)
(Continued)

(52) U.S. Cl.
CPC .............. *G21F 9/12* (2013.01); *B01D 59/00* (2013.01); *B01D 61/145* (2013.01);
(Continued)

(58) Field of Classification Search
CPC ........... G21F 9/12; G21F 9/165; B01D 59/00; B01D 61/145; B01D 61/147;
(Continued)

(56) References Cited

FOREIGN PATENT DOCUMENTS

| CN | 114291921 A | 4/2022 |
| CN | 218403867 U | 1/2023 |
| WO | WO2023042182 A1 | 3/2023 |

OTHER PUBLICATIONS

English translation of Chinese Published Patent Application No. 218403867 U (2023).*

* cited by examiner

*Primary Examiner* — John Kim
(74) *Attorney, Agent, or Firm* — George D. Morgan

(57) ABSTRACT

The present disclosure discloses an integrated rapid treatment system for nuclear medical radioactive wastewater and an application method thereof. This system includes a wastewater collection unit; a pretreatment unit; a deep purification unit; a solid decay unit; a buffer unit; an online monitoring unit; and a control unit, wherein the online monitoring unit includes a radioactivity level detection module for detecting total $\alpha$ and total $\beta$ radioactivity concentrations of inlet and outlet water of a medium in each unit, and a real-time monitoring module for treatment process parameters. The present disclosure discloses an integrated rapid treatment system for nuclear medical radioactive wastewater and an application method thereof, which can efficiently and quickly purify multi-nuclide organic low-level wastewater produced by a nuclear medical process, and realize rapid online monitoring and automatic control at the same time.

8 Claims, 6 Drawing Sheets

(51) Int. Cl.
*B01D 61/14* (2006.01)
*B01J 39/19* (2017.01)
*C02F 1/28* (2023.01)
*C02F 1/42* (2023.01)
*C02F 9/00* (2023.01)
*G21F 9/16* (2006.01)

(52) U.S. Cl.
CPC ......... *B01D 61/147* (2013.01); *B01D 61/149* (2022.08); *B01J 39/19* (2017.01); *C02F 1/28* (2013.01); *C02F 1/283* (2013.01); *C02F 1/42* (2013.01); *C02F 9/00* (2013.01); *G21F 9/165* (2013.01); *B01D 2101/04* (2013.01); *C02F 2001/425* (2013.01)

(58) Field of Classification Search
CPC .... B01D 61/149; B01D 2101/04; B01J 39/19; C02F 1/28; C02F 1/283; C02F 1/42; C02F 9/00; C02F 2001/425
See application file for complete search history.

INTEGRATED RAPID TREATMENT SYSTEM FOR NUCLEAR MEDICAL RADIOACTIVE WASTEWATER AND APPLICATION METHOD THEREOF

CROSS-REFERENCE TO RELATED APPLICATIONS

The application claims priority to Chinese patent application No. 2023110360676, filed on Aug. 16, 2023, the entire contents of which are incorporated herein by reference.

TECHNICAL FIELD

The present disclosure relates to the treatment of nuclear wastewater in the medical field. More specifically, the present disclosure relates to an integrated rapid treatment system for nuclear medical radioactive wastewater and an application method thereof.

BACKGROUND

Nuclear medicine is an emerging comprehensive interdiscipline that mainly uses radionuclides or nuclear rays to diagnose and treat diseases, and conducts research in life sciences and basic medicine. With the continuous development and improvement of modern nuclear medicine, the clinical application of nuclear medicine has grown rapidly in recent years, resulting in an explosive increase in the demand for medical isotopes and an increasing amount of radioactive wastes. If the radioactive wastes are discharged without treatment or improper treatment, the ecological environment will be exposed to radioactive contamination. At present, the treatment process of nuclear medical radioactive wastewater in China generally adopts a storage decay method, and its core idea is to store the wastewater in a relatively independent number of decay pools according to the time of wastewater production. After the natural decay of short lived medical nuclides, the wastewater is generally discharged up to standards after undergoing more than 10 half-lives. Compared with the increasing amount of radionuclides in nuclear medicine, the discharge standards for radioactive wastewater in China are gradually improving. This way of treating radioactive wastewater in nuclear medicine has gradually become no longer efficient. Moreover, there are problems such as large occupied area of the decay pool, small processing capacity, long radiochemical analysis cycle, complex process, high manual dependence, and poor data consistency, especially for hospitals that have been in normal operation, and their architectural patterns limit their inability to increase capacity and expand, resulting in an extremely limited number of patients accepted by hospitals.

SUMMARY

An objective of the present disclosure is to solve at least the above problems and/or defects and to provide at least the advantages that will be described later.

In order to achieve these objectives and other advantages of the present disclosure, an integrated rapid treatment system for nuclear medical radioactive wastewater is provided, including:
a wastewater collection unit for receiving and temporarily storing wastewater from clinical practice in nuclear medicine;
a pretreatment unit for performing solid-liquid separation on wastewater outputted from a wastewater collection pool;
a deep purification unit for performing multi-level nuclide extraction and separation on clear liquid outputted from the pretreatment unit;
a solid decay unit for performing natural decay on solid impurities outputted from the pretreatment unit over time;
a buffer unit for temporarily storing decayed solid impurities and clear liquid;
an online detection unit matching the respective units; and
a control unit connected in communication with the online detection unit to switch working states of the respective units, wherein
the online detection unit includes: a radioactivity level detection module for detecting total $\alpha$ and total $\beta$ radioactivity concentrations of a medium in each unit, and a process parameter monitoring module for detecting key process parameters of the treatment process in real time.

Preferably, the wastewater collection unit is configured to include a wastewater collection pool poured by concrete;
the wastewater collection pool is communicated with an inlet end of the pretreatment unit through a matching pipeline I.

Preferably, the pretreatment unit is configured to include a solid-liquid separation module welded by stainless steel; and
a pretreatment assembly I and a pretreatment assembly II, which are connected in parallel and/or series with the solid-liquid separation module through a pipeline II and a pipeline III;
the pretreatment assembly I includes a sand filtration module and a carbon adsorption module which are connected in series, and the pretreatment assembly II includes a microfiltration module and an ultrafiltration module which are connected in series;
the solid-liquid separation module, the ultrafiltration module and the carbon adsorption module are respectively communicated with the solid decay unit and the deep purification unit through a pipeline IV, a pipeline V and a pipeline VI which are matched with each other; and
the online detection unit further includes:
a particle detection module which is arranged on an output side of the solid-liquid separation module and used for detecting particle sizes of suspended solids in wastewater subjected to solid-liquid separation.

Preferably, the solid decay unit is configured to include a plurality of decay pools that is poured by concrete and is independent of each other;
each decay pool is communicated with a buffer pool through a matching pipeline VII, and each decay pool receives and temporarily stores solid impurities generated by the pretreatment unit according to a chronological production order of the solid impurities, respectively.

Preferably, the deep purification unit is configured to include a plurality of independent nuclide extraction and separation modules in a serial connection arrangement;
the outside of each nuclide extraction and separation module is covered with a radiation protection layer in a detachable manner, and the nuclide extraction and separation module located at the tail end is communicated with the buffer pool through a matching pipeline V;

the nuclide extraction and separation module at the lower level is communicated with the nuclide extraction and separation module at the upper level through a matching pipeline VI to form a self-circulation path of the deep purification unit.

Preferably, the control unit is configured to include an input module, a communication module, a control module, an execution module, a display module, and an alarm module, wherein the execution module is configured to include valves, pumps and selection switches, which are arranged on connecting pipelines of the respective units.

Preferably, the buffer unit is configured to include a buffer pool I, a buffer pool II and a buffer pool III which have the same volume and are connected in parallel.

An application method of an integrated rapid treatment system for nuclear medical radioactive wastewater includes:

1, the control unit receiving various control parameters inputted by a user, and controlling working states of the respective units based on the control parameters;

2, the online detection unit detecting total α and total β radioactivity concentrations of the pretreatment unit and the deep purification unit and related process parameters in real time, and controlling parameters applied in the processes, equipment and formulas of the pretreatment unit and the deep purification unit according to the detection results;

the online detection unit detecting a solid impurity storage capacity and radioactivity level of each solid decay pool in the solid decay unit in real time, and feeding back to the control unit, and the control unit controlling a working state of the execution module on each solid decay pool based on the detection results; and the online detection unit detecting a storage capacity and radioactivity level of the buffer unit in real time, and feeding back to the control unit, and the control unit controlling a working state of an execution module on the buffer unit based on the detection results.

Preferably, in step 2, the online detection unit detects total α and total β radioactivity concentrations of an effluent of the tail nuclide extraction and separation module of the deep purification unit, and determines whether the radioactivity level of the effluent is lower than a limit of the national standard; if the radioactivity level of the effluent is lower than the limit of the national standard, the execution module corresponding to the deep purification unit is activated, and the effluent is discharged to the buffer pool I of the buffer unit for temporary storage;

otherwise, the execution module on the self-circulation path is activated according to the radioactivity level, and the effluent is conveyed to the corresponding nuclide extraction and separation module at the upper level for secondary processing.

Preferably, in step 2, when the buffer pool I of the buffer unit is in a full state, the control unit switches a working state of a pipeline at an input end of the buffer pool I to a closed state, and a working state of a pipeline at an input end of the buffer pool II to an opened state;

whether the solid and liquid in the buffer pool I meet discharge standards is detected by a third-party detection institution; if the detection result meets the discharge standards, the control unit switches a pipeline at an output end of the buffer pool I to an opened state for discharge; after the buffer pool I is emptied and the buffer pool II is full, the control unit switches the working state of the pipeline at the input end of the buffer pool II to a closed state, and switches the working state of the pipeline at the input end of the buffer pool I to an opened state;

otherwise, a working state of a pipeline at an input end of the buffer pool III is switched to an opened state, a working state of a connecting pipeline between the buffer pool I and the pretreatment unit is switched simultaneously, and the solid and liquid in the buffer tank I are subjected to secondary treatment.

The present disclosure includes at least the following beneficial effects: the present disclosure can efficiently purify the radioactive wastewater produced by nuclear medicine, and realize rapid online monitoring and timely discharge of wastewater simultaneously, and is of great significance in the aspects of alleviating the current embarrassment of patients in hospitals to accept treatment, improving the medical environment of patients, etc.

Other advantages, objectives and features of the present disclosure will be embodied partly by the following description, and partly will be understood by those skilled in the art through the study and practice of the present disclosure.

DETAILED DESCRIPTION OF THE EMBODIMENTS

The present disclosure is further described in detail below in conjunction with the accompanying drawings, so that those skilled in the art can implement the present disclosure with reference to the text of the description.

It should be understood that the terms "have", "contain" and "include" as used herein do not match the presence or addition of one or more other components or combinations thereof.

Figure 1:
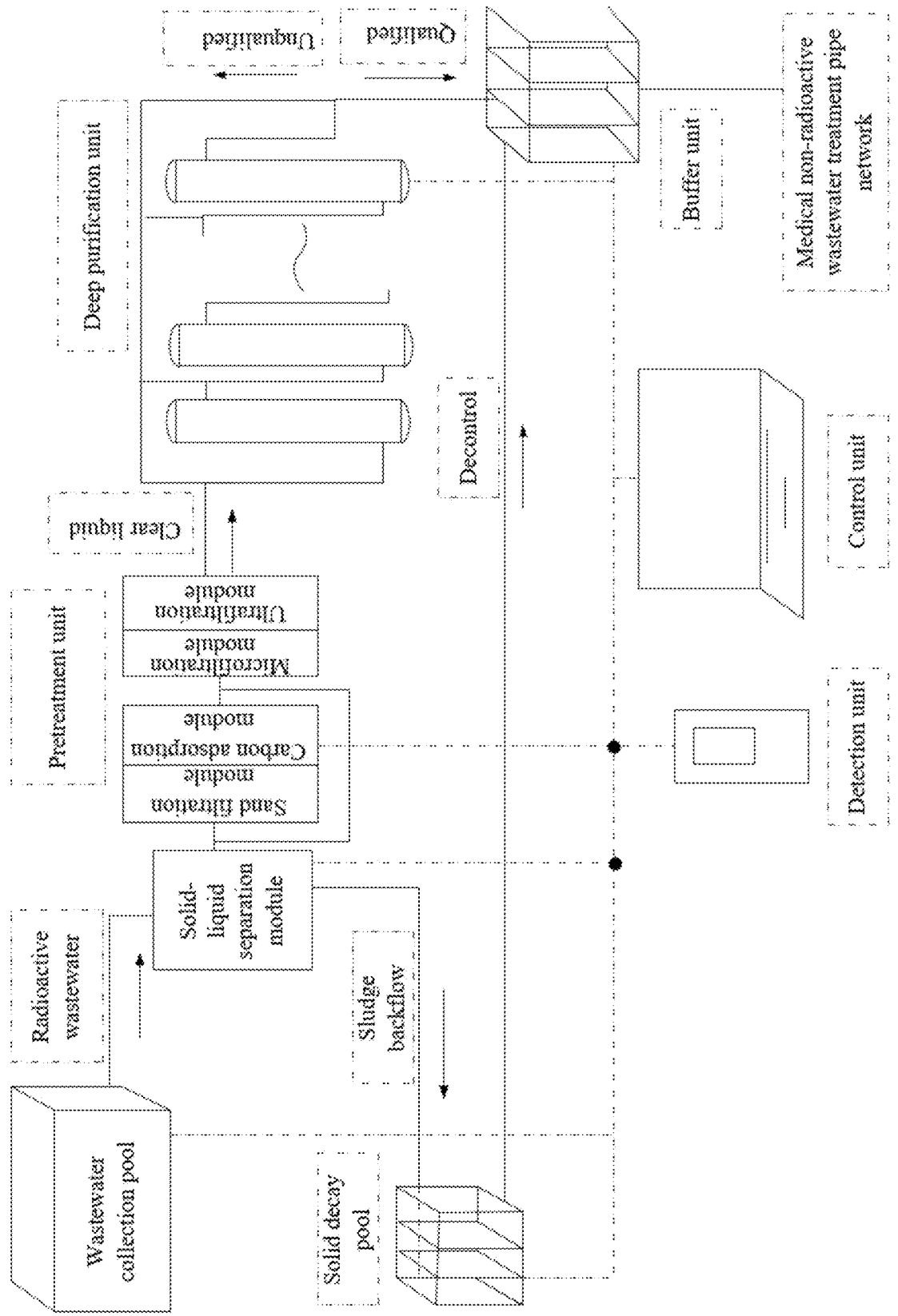
FIG. 1 is a composition block diagram of an integrated rapid treatment system for nuclear medical radioactive wastewater according to the present disclosure.

As shown in FIG. 1, the system mainly includes seven parts: a wastewater collection pool, a solid decay pool, a pretreatment unit, a deep purification unit, a buffer pool, an online detection unit and a control unit. The functions of various parts are described below.

(1) The wastewater collection pool is poured by concrete, and used to receive and temporarily store wastewater (including solid impurities) generated by the clinical practice of nuclear medicine, and convey the wastewater to the pretreatment unit through a pipeline.

(2) The pretreatment unit consists of a solid-liquid separation module made of stainless steel by means of welding, as well as a pretreatment assembly I and a pretreatment assembly II arranged in parallel downstream of the solid-liquid separation module; the pretreatment assembly I includes a sand filtration module and a carbon adsorption module which are connected in series; the pretreatment assembly II includes a microfiltration module and an ultrafiltration module which are connected in series (materials of the microfiltration module and the ultrafiltration module herein are configured to include, but not limited to, polymeric materials such as polytetrafluoroethylene and vinylidene tetrafluoroethylene and ceramic membrane materials such as alumina and zirconia); an inlet of the solid-liquid separation module is connected with the wastewater collection pool through a pipeline, and an outlet of the solid-liquid separation module is communicated with the solid decay pool, the pretreatment assembly I and the pretreatment assembly II respectively, such that pretreated solids are subjected to a decay treatment through the solid decay pool; the solid wastes after the decay treatment by the solid decay pool can be directly discharged to a medical non-radioactive wastewater treatment pipe network in a hospital after being detected to be qualified; an output end of the ultrafiltration module and an output end of the carbon adsorption module are connected with an inlet of the deep purification unit through a pipeline, respectively, playing a role of separating the solid impurities from the wastewater, removing particulate and organic matters and provide clear liquid for the wastewater deep purification unit. In practical applications, when two sets of assemblies are connected in parallel, the wastewater containing different particle sizes can be conveyed to different assembles for treatment. For example, when the particulate and organic matters have small particle sizes (when the particulate and organic matters have particle sizes of less than 50 microns), they are treated by using the microfiltration+ultrafiltration modules of the pretreatment module II only (that is, the wastewater treated by the solid-liquid separation module is directly outputted to an inlet of the microfiltration module through pipeline switching). After treatment, the clear liquid required by the deep purification unit is obtained.

When the two sets of assemblies are connected in series, a radioactive wastewater stock solution enters the solid-liquid separation module of the pretreatment unit from the wastewater collection pool to be treated, so as to obtain solid and liquid wastes. The solid wastes enter the solid decay pool in the form of sludge. After the liquid wastes are detected by the online detection unit in real time, if the solid content has a large particle size or more organic matters are present, the liquid wastes enter the sand filtration+carbon adsorption modules for further solid-liquid separation, and finally enter the microfiltration+ultrafiltration modules for treatment to obtain clear liquid required by the deep purification unit. Otherwise, the liquid wastes go directly.

The detection of the particulate and organic matters is realized by the particle detection module arranged on an output side of the solid-liquid separation module.

(3) The solid decay pool is poured by concrete and is divided into several independent decay sub-pools, wherein each decay sub-pool is connected with the pretreatment unit and the buffer pool through pipelines, respectively. According to a chronological production order of solid impurities, the solid impurities produced by the pretreatment unit are respectively received and temporarily stored, and the solid impurities are naturally decayed until they are decontrolled and then discharged to the medical non-radioactive wastewater treatment pipe network in the hospital.

(4) The deep purification unit is composed of several independent nuclide extraction and separation modules which are connected in tandem, and each nuclide extraction and separation module is covered with a detachable radiation protection layer such as lead skin, so as to reduce the radiation damages to equipment and personnel caused by the nuclide extraction and separation module after enrichment. An inlet of the deep purification unit is connected with the pretreatment unit through a pipeline so as to receive the clear liquid discharged from the pretreatment unit and perform multi-level treatment of nuclide extraction and separation of the clear liquid. An outlet of the deep purification unit is connected with the buffer pool and an inlet of each nuclide extraction and separation module through pipelines, respectively. An effluent obtained by deep purification is discharged to the buffer unit after the radioactivity level is detected to be qualified, otherwise returns to the first-level nuclide extraction and separation module according to the radioactivity level and continues to carry out self-circulation treatment until it is detected to be qualified and discharged.

(5) The buffer unit is poured by concrete and includes a buffer pool I, a buffer pool II and a buffer pool III which have the same volume and are connected in parallel. The buffer pool I, the buffer pool II and the buffer pool III are connected with the solid decay pool, the deep purification unit and the medical non-radioactive wastewater treatment pipe network in a hospital through pipelines. The buffer unit functions to temporarily store the solid impurities decontrolled from the solid decay pool and the effluent of the deep purification unit, which are then discharged to the medical non-radioactive wastewater treatment pipe network in the hospital after the radioactivity level is detected again to be qualified.

(6) The online detection unit is composed of a radioactivity level detection module, a process parameter monitoring module and a communication module I. Detection objects of the radioactivity level detection module are total $\alpha$ and total $\beta$ radioactivity concentrations of radioactive mediums in the wastewater collection pool, the solid decay pool, the pretreatment unit, the deep purification unit and the buffer unit. The total $\alpha$ and total $\beta$ here refer that the wastewater may contain a variety of nuclides and a or p rays to be released, so should be superimposed together. Wastewater level, flow, temperature, pressure, conductivity, pH and other parameters are detected by the process parameter monitoring module in real time. The communication module I transmits all detection results to the control unit. The communication module I here is paired with a communication module II in the control unit, thereby realizing data communication between the units. The process parameters are all realized by the matching sensor, such as detecting a liquid level using a liquid level sensor, detecting a pressure using a pressure sensor, etc. The sensors in various process parameters are mounted according to the actual needs.

(7) The control unit includes an input module, a communication module, a control module, an execution module, a display module, and an alarm module. The input module accepts operator's instructions and detection results of the online detection unit as given values for the control unit. The communication module transmits the given values to the control module, and the control module receives the given values and outputs a control signal to the execution module. The execution module is mainly composed of valves, pumps and selection switches which are used to connect the wastewater collection pool, the solid decay pool, the pretreatment unit, the deep purification unit and the buffer pool. In practical applications, the valves are used to control opened-closed states of the connecting pipelines on the various units. The pumps are used to convey the mediums of the respective units to the corresponding units of the next process through an external force. The selection switches are divided into a position switch, a thermoswitch, a liquid level switch, an inertia switch, etc. according to the needs, providing that if there are four switches connected in parallel, but only one switch can be "on" at a time, and the other three are "off". It is equivalent to choosing one out of four.

The execution module receives a control signal to control the flows of wastewater, solid impurities and effluent. The display module is mainly used for real-time display of the operator's instructions and the detection results of the online detection unit. In the working process of the system, the alarm module generates sound and light signals when various parameters are abnormal or the treatment is completed, prompting the operator to deal with in time.

Figure 2:
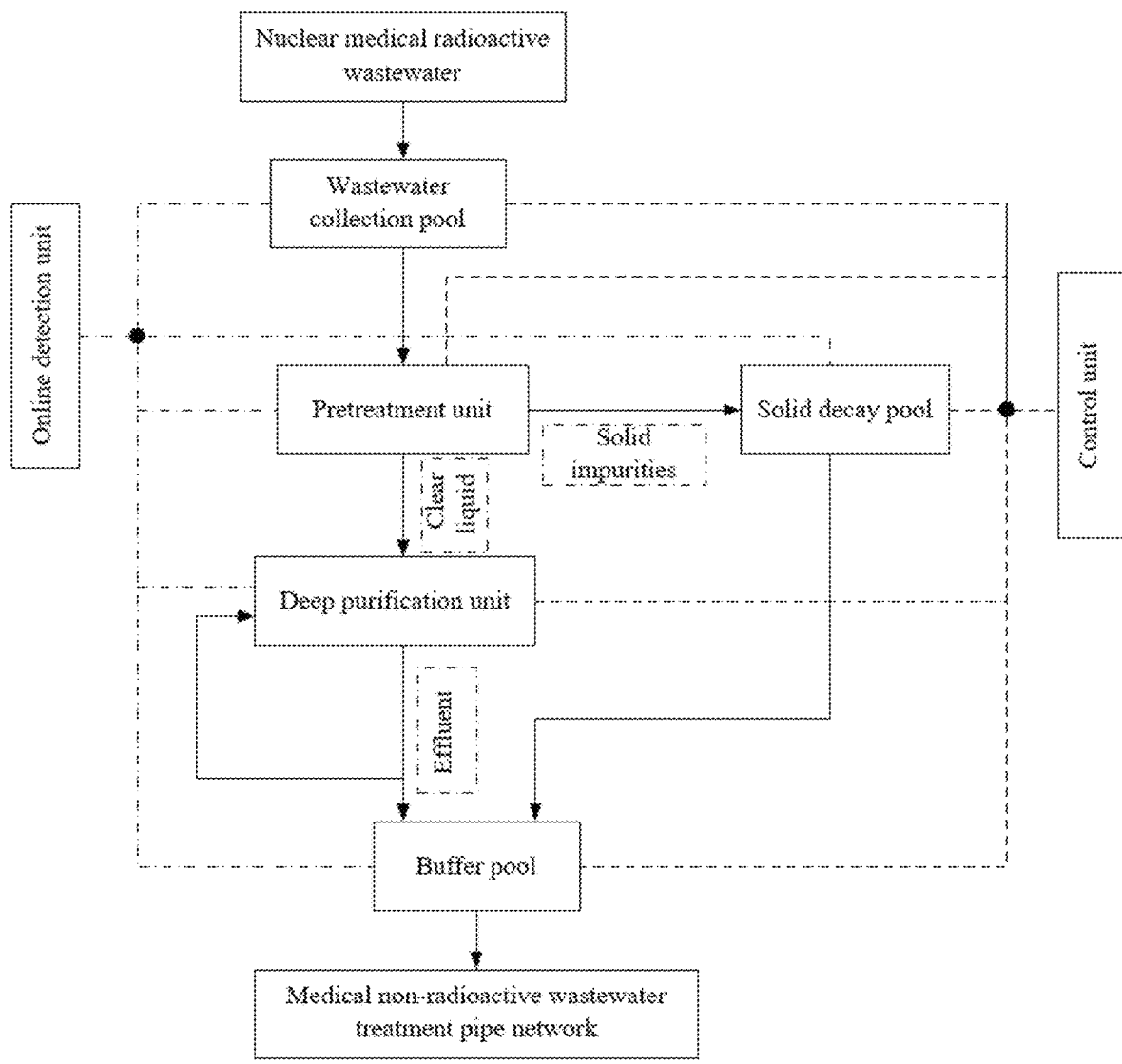
FIG. 2 is a schematic diagram of a working process of the integrated rapid treatment system for the nuclear medical radioactive wastewater according to the present disclosure.
Figure 3:
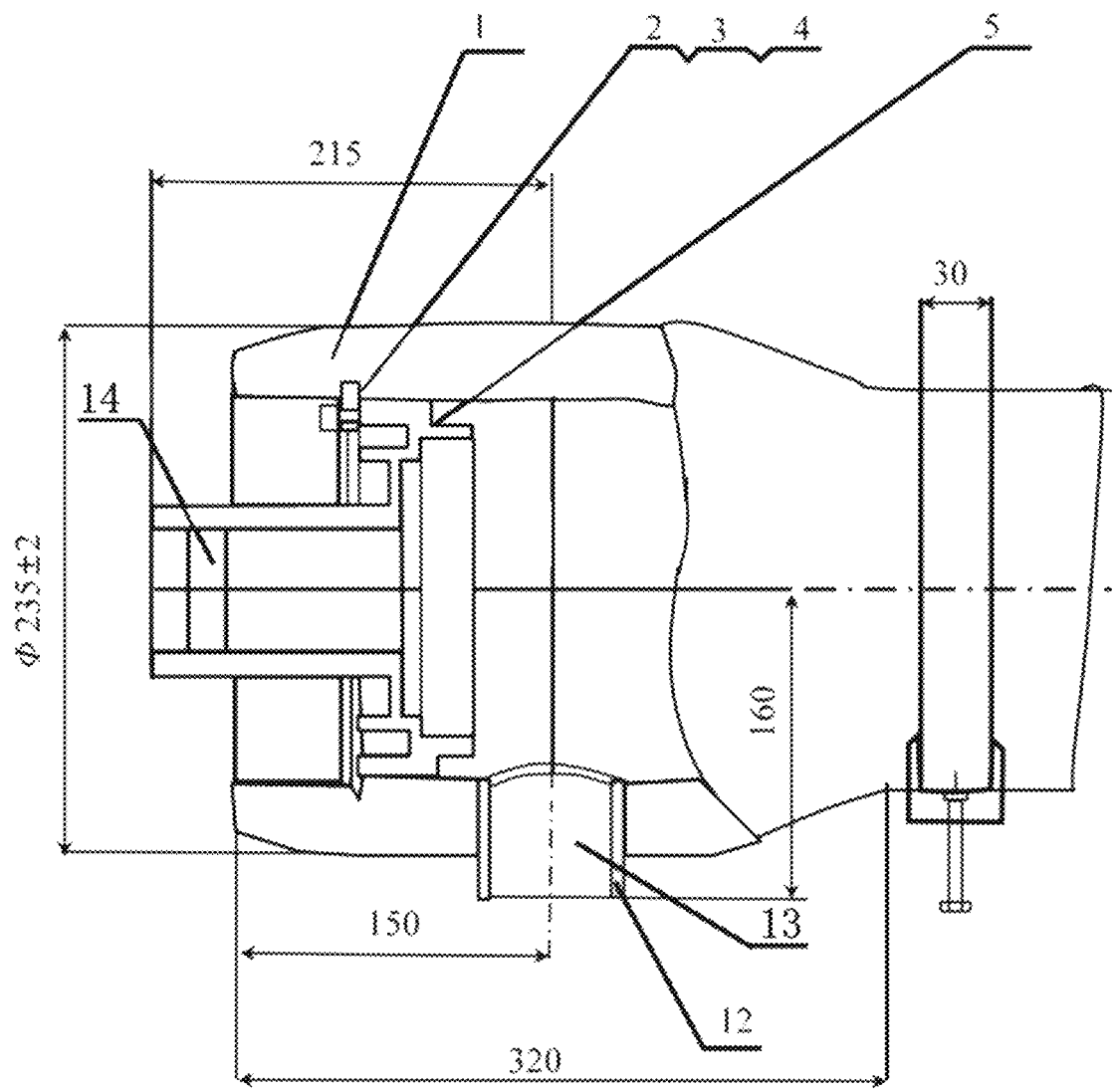
FIG. 3 is a side view of a water inlet side of an ion exchange adsorber in an embodiment of the present disclosure.
Figure 4:
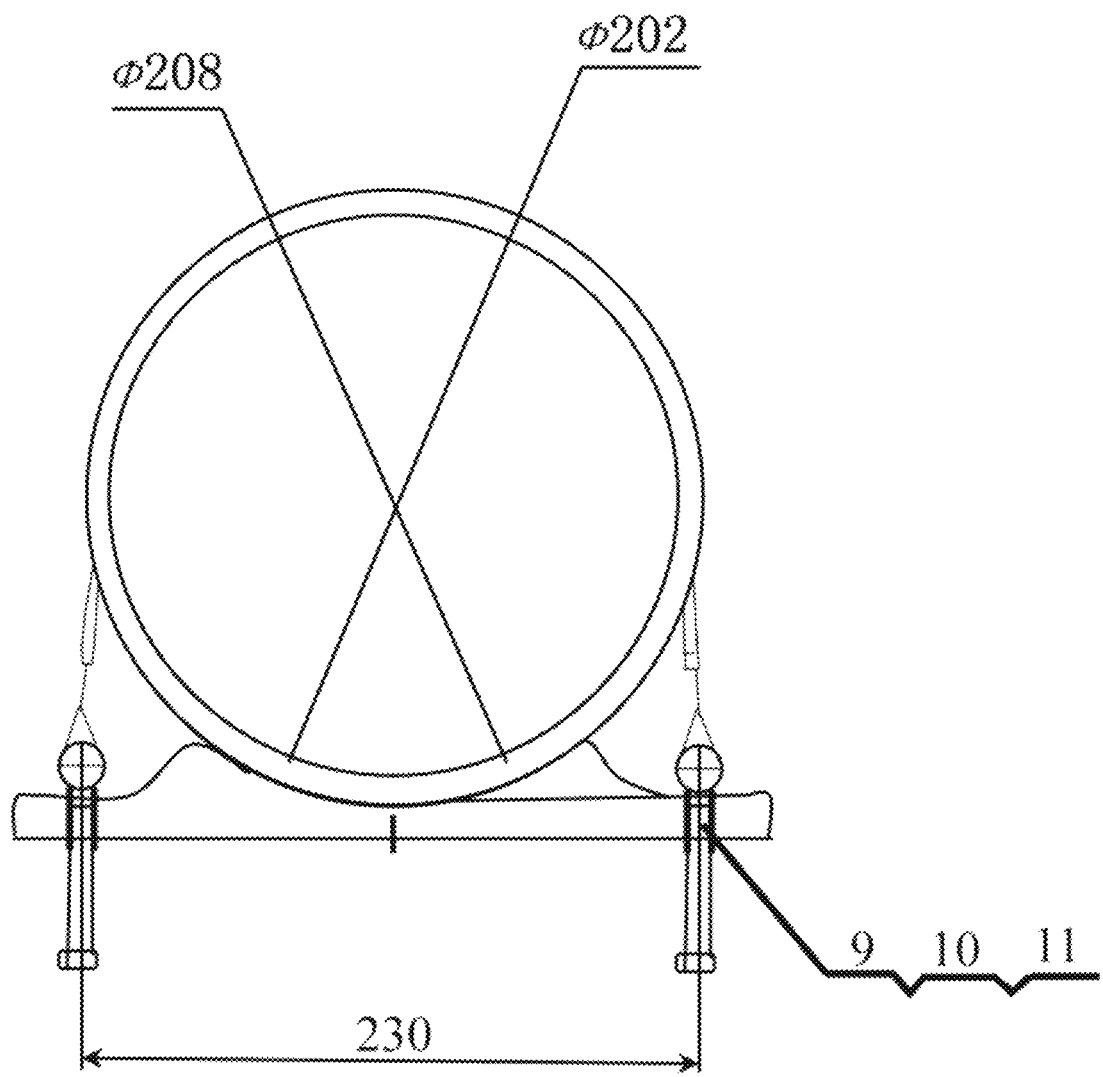
FIG. 4 is a side view of a water inlet side of an ion exchange adsorber in an embodiment of the present disclosure from another perspective.
Figure 5:
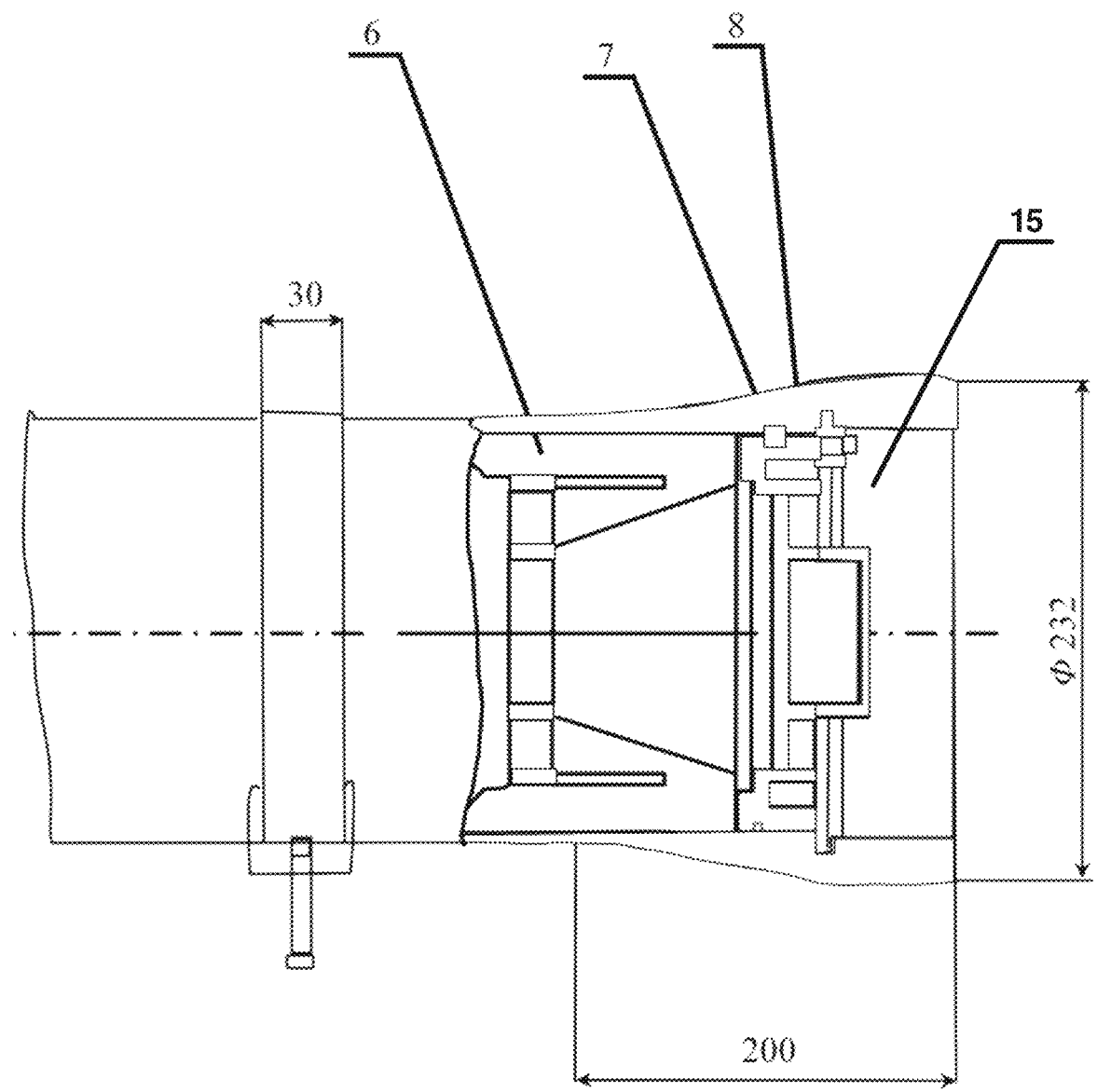
FIG. 5 is a side view of a water outlet side of an ion exchange adsorber in an embodiment of the present disclosure.
Figure 6:
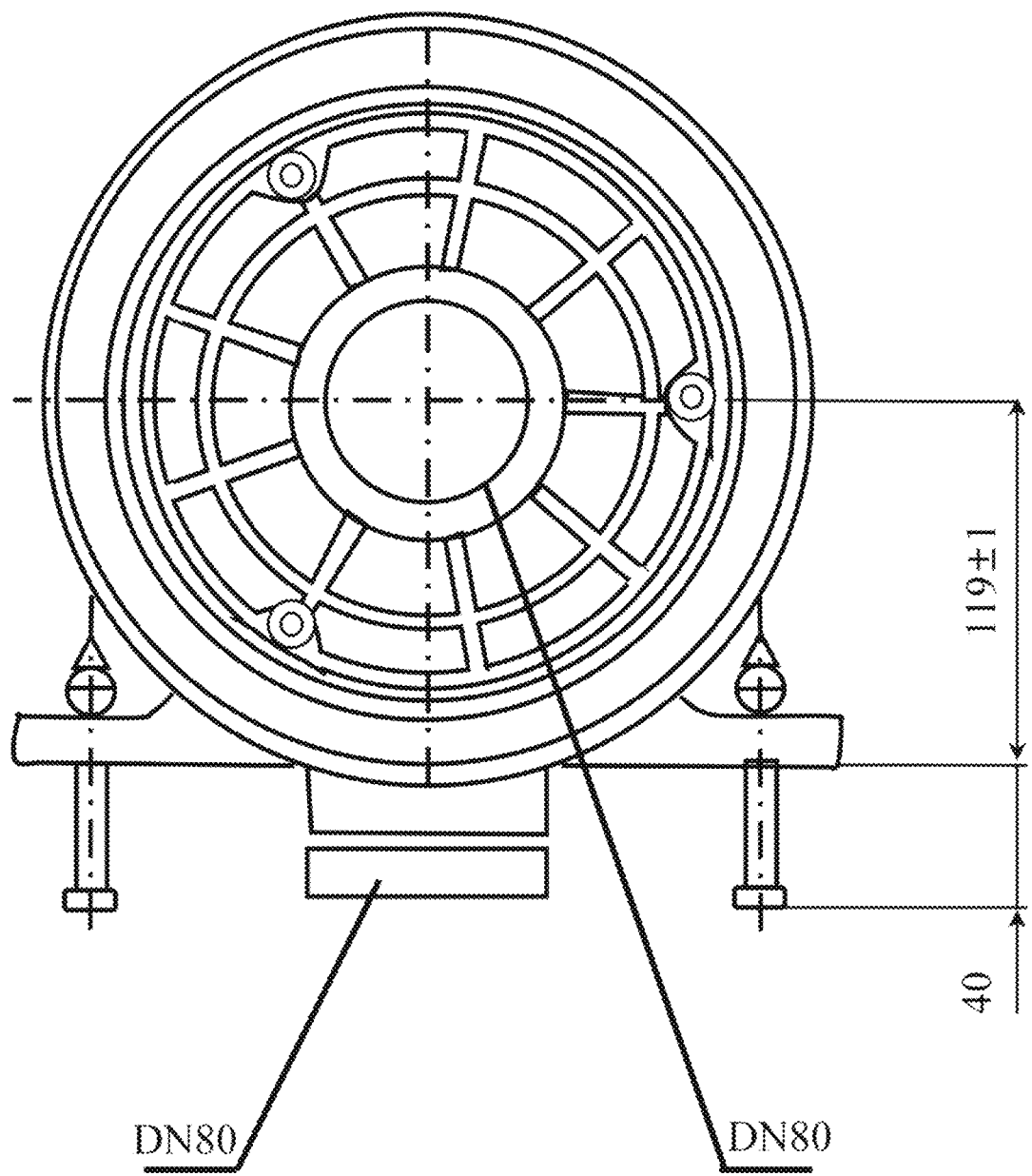
FIG. 6 is a side view of a water outlet side of an ion exchange adsorber in an embodiment of the present disclosure from another perspective.

FIG. 2 shows a working process of the integrated rapid treatment system for the nuclear medical radioactive wastewater, which is specifically divided into the following six steps.

(1) The nuclear medicine radioactive wastewater enters the wastewater collection pool in real time, and the control system receives the operator's instructions to activate the online monitoring system to detect a liquid level of the wastewater collection pool in real time, and after the liquid level reaches a set value, the pretreatment unit, the solid decay pool, the deep purification unit and the buffer pool are activated in sequence. Otherwise, the pretreatment unit, the solid decay pool, the deep purification unit and the buffer pool will not be activated.

(2) After the system enters a working state, the control unit activates the valves and the pumps between the wastewater collection pool and the pretreatment unit according to a preset flow rate, and conveys the wastewater from the wastewater collection pool to the pretreatment unit. The online detection system detects a wastewater flow rate in real time and feeds it back to the control unit, which then displays and controls the wastewater flow rate.

(3) The pretreatment unit performs solid-liquid separation on the wastewater conveyed from the wastewater collection pool to remove particulate and organic matters. After the pretreatment is completed, the control unit activates the valves and pumps between the pretreatment unit and the solid decay pool, the pretreatment unit and the deep purification unit. The solid impurities are conveyed to the solid decay pool and dispensed into various sub-pools in chronological order for temporary storage, so that the solid impurities can decay naturally, and clear liquid enters the deep purification unit. The online detection system detects total $\alpha$ and total $\beta$ radioactivity concentrations, liquid level, flow rate, temperature, pressure, conductivity, pH and other parameters of the wastewater in the pretreatment unit in real time. The control unit displays these parameters, and controls the parameters of process equipment and formulas of the pretreatment unit. The parameter control for the process equipment here refers to the control for flow, pressure, pH and other parameters in the process, while the formula parameter control generally refers to a separating agent of the pretreatment unit and an ion exchange fiber of the deep purification unit.

(3) The online detection system detects a storage capacity and radioactivity level of the solid impurities in the solid decay pool in real time and feeds back to the control unit, and the control unit displays the storage capacity and radioactivity level. If the decay sub-pool has been full, the control unit controls the selection switch to transfer the solid impurities into another empty decay sub-pool. If the radioactivity level of a decay sub-pool reaches a decontrol level, the control unit activates valves, pumps and selection switches connecting the solid decay pool to the medical non-radioactive wastewater treatment pipe network in the hospital, to discharge the solid impurities to the buffer unit.

(4) The deep purification unit performs multi-level nuclide separation on the clear liquid. After the treatment is completed, the online detection system detects total $\alpha$ and total $\beta$ radioactivity concentrations, liquid level, flow, temperature, pressure, conductivity, pH and other parameters of an effluent of the deep purification unit in real time. The control unit displays these parameters, and controls the parameters of the process equipment and formula of the deep purification unit. If the radioactivity level of the effluent is lower than a limit of the national standard, the control unit activates the valves and pumps of the deep purification unit and the buffer unit to discharge the effluent to the buffer unit. Otherwise, the control unit activates the valves, pumps and selection switches for self-circulation of the deep purification unit according to the radioactivity level, and conveys the effluent to the nuclide extraction and separation module of the corresponding level until the radioactivity level is lower than the limit of the national standard and the effluent is discharged.

(5) The buffer unit temporarily stores the emissions of the solid decay pool and the deep purification unit, the online detection system detects a storage capacity and radioactivity level of the emissions in real time and feeds back to the control unit, and the control unit displays the storage capacity and radioactivity level.

In the present disclosure, the buffer unit includes a buffer pool I, a buffer pool II and a buffer pool III which have the same volume and are connected in parallel. Input ends of the buffer pool I, the buffer pool II and the buffer pool III are communicated with the solid decay unit and the deep purification unit through an execution mechanism I, an execution mechanism II and an execution mechanism III which are matched with each other, respectively, and output ends of the buffer pool I, the buffer pool II and the buffer pool III are communicated with the medical non-radioactive wastewater treatment pipe network and the pretreatment unit.

If the buffer pool I has been full, the output end of the deep purification unit is communicated with the buffer pool II, the buffer pool II is in a working state, and the buffer pool I needs to wait for the detection of a third-party detection institution.

If the buffer pool I has been full, through the detection of the third-party detection institution, that is, the radioactivity level reaches the decontrol level, the control unit activates valves and pumps for connecting the buffer pool I and the medical non-radioactive wastewater treatment pipe network in the hospital. The emissions are discharged to the medical non-radioactive wastewater treatment pipe network, such that the buffer pool I is in a to-be-used state. After the buffer pool I is emptied, the buffer pool II is full, and the control unit switches the working state of the pipeline at the input end of the buffer pool II to a closed state, and switches the working state of the pipeline at the input end of the buffer pool I to an opened state.

Otherwise, the buffer pool II pauses work to be detected, and meanwhile the buffer pool III is activated in a working state. The working state of the pipeline at the input end is switched to the closed state, the working state of the pipeline at the input end of the buffer pool III is switched to the opened state, and a solid-liquid pump in the buffer pool I returns to the pretreatment unit for secondary treatment, so that the buffer pool I can be emptied again and is in a to-be-used state.

In the same way, the buffer pool II and the buffer pool III need to be detected by the third-party detection institution after they are full, their radioactivity levels are determined to reach the decontrol level, and a similar workflow to the buffer pool I is executed according to the determination results.

(6) According to the radioactivity levels and process parameters of various parts detected by the online detection system in real time, if the abnormality is caused or wastewater treatment is completed, the control unit activates an alarm, and the operator will maintain the treatment or shut down the system.

According to the present disclosure, by arranging the deep purification unit for multi-level nuclide extraction and separation treatment, the clear liquid treated by the pretreatment unit is deeply purified, and a solid medium treated by the pretreatment unit is treated through the solid decay unit. Further, total $\alpha$ and total $\beta$ radioactivity concentrations and various process parameters of the treatment process in the mediums of various parts are further detected in real time in conjunction with the online detection unit, so as to make the radiochemical analysis cycle and process controllable, thereby effectively reducing the dependence on labor and maintaining good data consistency. Therefore, the present disclosure can be directly applied to hospitals that are already in normal operation, and has better adaptability.

Further, the rapid deep purification unit is composed of a plurality of ion exchange adsorbers, and functions to realize the enrichment of radionuclides in wastewater and the radioactive removal of wastewater. As shown in FIG. 2, the deep purification unit is formed by parallel connection of two sets of two-level series adsorbers that are backup to each other, with a total of 4 adsorbers. Inlets of the two sets of adsorption devices are respectively communicated with the pretreatment unit through pipelines, and outlets of the two sets of adsorption devices are respectively communicated with an inlet of each ion exchange adsorber and an inlet of the buffer unit. After the total radioactivity level to be monitored on line is measured up to the standards, purified liquid is discharged into the buffer unit, or returns to the next level of adsorber and continues to carry out deep purification treatment until the purified liquid is detected to be qualified and discharged. During operation, the first set of adsorption devices is used. If the purified liquid is not up to the standards, the purified liquid flows back to an inlet of one of the ion exchange adsorber in this set of adsorption devices to complete secondary purification. This process is also self-circulation (performed under a condition of high initial activity of wastewater or large amount of wastewater).

When the radioactivity level of the first set of adsorption devices reaches a large limit of low-level radioactive waste, the second set of adsorption devices is activated. At this moment, the first set of adsorption devices is allowed to decay spontaneously, and continues to be used after the decay is completed. The two sets of adsorption devices are switched in rotation for many times, which is suitable for long-term action plans and avoids direct contact between personnel and radioactive wastes. After the adsorber fails, it will be replaced without stopping. The adsorber adopts a disposable filter element structure. A filter element is mounted in the form of a quick-assembly structure. An adsorbent material is replaced by directly plugging and unplugging the filter element. The inlets and outlets of various ion exchange adsorbers are communicated, and connected by a connection mode of high-pressure hoops. The adsorbers at all levels can realize arbitrary series and parallel switching and communication operations, are equipped with electromagnetic valves, and operated by an automatic control system to be opened and closed. This adsorber has a compact structure and a small footprint, such that the filter element can be replaced easily later while ensuring high-performance adsorption. The ion exchange adsorbers are filled with a high-density ion exchange fiber or a resin adsorbent material. The ion exchange fiber or resin is at least one of a strong basic ion exchange fiber/resin or a weak basic anion exchange fiber/resin. The waste filter element is stored and treated in a concentrated manner as radioactive solid waste, and washed and regenerated after the radioactive level drops to a safe value. The filter element can be reused many times. A regenerated detergent is at least one of sodium chloride, potassium chloride, dilute hydrochloric acid, and ammonium chloride.

Further, as shown in FIGS. 3 to 6, the ion exchange adsorbers at all levels are configured to include:

an adsorber shell 1 made of a FRP material, wherein a water inlet 14 is arranged at one end of the adsorber shell 1, and a water outlet 15 is arranged at the other end of the adsorber shell 1; the water outlet and the water inlet are used for connecting with the pipelines in the site layout; then, through various valves arranged on the pipelines, different series or parallel layout effects are constructed on the site, and also through the modular setting, the assembly and disassembly can be performed more easily; a side water outlet 13 is arranged on the adsorber shell through a side water outlet pipe 12 according to the actual needs in the site;

a water inlet end plate 5 arranged on a water inlet side through a stop block 4, wherein the stop block is fixedly connected with the water inlet end plate through a stop bolt 2 and a spring gasket 3, so as to ensure the stability of the cooperation between the structures, while the water inlet end plate functions to connect a water inlet pipeline, dispense inlet water to an adsorbent material, seal and fix the adsorbent material, and control the water inlet flow;

a handle end plate 8 arranged on a water outlet side through a thrust ring 6, wherein a corresponding sealing ring 7 is arranged at a position, matching an inner side wall of the adsorber shell, of the handle end plate, so as to ensure the sealability, while the handle end plate functions to operate the filter element to be assembled and disassembled more conveniently, fix the filter element safely, seal and connect water inlet and outlet pipelines; and a disposable filter element arranged in the adsorber shell by means of direct plugging and unplugging, wherein the filter element structure that is directly plugged into and unplugged from the adsorber shell makes it easy to take out and replace when the filter element fails to achieve the effect in the later stage.

Both ends of the adsorber shell are connected with pipelines through hoops. In this structure, the ion exchange adsorber and the corresponding pipeline can be quickly connected through hoops, achieving rapid assembly and disassembly, However, according to the needs, the hoop is configured to include: a strapping belt 9 matched with an external structure of the adsorber shell, and a saddle 11 matched with the strapping belt. The strapping belt and the saddle are connected into an integral structure, so as to complete the mounting of the ion exchange adsorber and the corresponding pipeline through a strapping belt bolt 10. An arc-shaped limiting groove is formed in a side wall, matching the adsorber shell, of the saddle, so as to ensure that the fit degree between structures meets installation requirements.

The nuclear medical radioactive wastewater produced from the production and use of radioisotopes in the nuclear medicine department enters the ion exchange deep purification adsorber in one of two sets of adsorption devices, which are backed up to each other and formed by two-level series adsorbers, by means of a liquid inlet pump at a constant flow rate. The purified liquid subjected to ion exchange is monitored on line for radioactivity concentration. The purified liquid that meets the requirements of radioactive discharge can be directly discharged. Otherwise, the control unit controls the return of the purified liquid to one level of the ion exchange adsorbers for re-purification until it is discharged up to the standards. An optimal process of an ion exchange rapid deep purification unit has a scale of two sets of two-level adsorbers. When the first set of adsorption devices reaches a maximum limit of low-level radioactive wastes, a process route of deep purification treatment is switched to the second set of adsorption devices. There is no need to operate the first set of adsorption devices, only let them spontaneously decay to the background level and continue to be used. The two sets of adsorption devices are switched in turn. After the ion exchange adsorber fails, the filter element of the failed ion exchange adsorber is replaced, and the replaced waste filter element is temporarily stored and treated in accordance with the requirements of radioactive solid waste treatment.

Replacing the ion exchange adsorber requires both of the following conditions: (1) by detecting the activity of the waste water stock solution and the purified liquid, a purification coefficient (total radioactivity before treatment/total radioactivity after treatment) is calculated, and if the purification coefficient is less than a set value, it is satisfied; and (2) the service life of the general ion exchange adsorber is calculated by experimental experience or theoretical calculation, and if the service life is greater than a set value, it is satisfied.

This treatment method is a continuous treatment process. In the operation process, there is no need to disassemble the process pipeline system to replace core components such as the filter core of the ion exchange adsorber after shutdown. Only one of two sets of multi-level series adsorbers that are backup to each other is used for operation at a time. When it is detected that the ion exchange adsorber of this set of purification units in use has met replacement requirements, it will be quickly switched to another spare purification unit for wastewater treatment. Meanwhile, the ion exchange adsorbent material will be quickly replaced by directly plugging, unplugging and disassembling the filter element.

Generally speaking, a set of two-level ion exchange adsorbers in the present disclosure has a predetermined service life value: the total $\beta$ of stock solution=600 Bq/L; a larger limit of low-level radioactive wastes is set to $3.7\times10^6$ Bq/kg (parallel line switching); a filling capacity of the adsorbent material of the single-level ion exchange adsorber is 35 kg; the capacity of wastewater treated by the adsorber to reach the limit of low-level radioactive wastes is 215 m$^3$; the capacity of wastewater treated by one set of two-level ion exchange adsorbers is 430 m$^3$; and one set of two-level ion exchange adsorbers runs for half a year, then decays in situ for half a year, and then continues to be used. Taking I-131 as an example, a saturated adsorption capacity of the material for iodine is 2000 mg/kg, an actual adsorption capacity of the material for iodine ions per year is $3.7\times10^6$ Bq/kg (equivalent to 0.8 ng/kg), a theoretical value of the predetermined service life value is long-term, and the service life of the preliminarily designed single ion exchange adsorber is 20-50 years.

Embodiment 1

A method and process for deep purification and treatment of nuclear medical radioactive wastewater include the following steps:
1) temporary storage: a volume of nuclear medical radioactive wastewater in a temporary storage tank is 2.5 L, with total $\alpha$=1.548 Bq/L and total $\beta$=620.657 Bq/L;
2) ion exchange: the wastewater successively flows through I-level and II-level ion exchange adsorbers (two-level serial connection mode) through a peristaltic pump at a flow rate of 11.7 mL/min, and a single adsorber is filled with 20 g of weak alkaline ion exchange fiber;
3) radioactivity monitoring: a radioactivity concentration of purified liquid is measured; and
4) discharge up to standards: the radioactivity level of the purified liquid meets an emission standard limit specified in China, and actual values include total $\alpha$=0.005 Bq/L and total $\beta$=0.311 Bq/L.

For this embodiment, the treatment cycle is 3.56 h.

Comparative example: for nuclear medical radioactive wastewater with total $\alpha$=1.548 Bq/L, total $\beta$=620.657 Bq/L, and a volume of 2.5 L, a decay pool is used in the prior art for storage, and the wastewater is allowed to be discharged till the storage time is at least 48 days.

Embodiment 2

A method and process for deep purification and treatment of nuclear medical radioactive wastewater include the following steps:
1) temporary storage: a volume of nuclear medical radioactive wastewater in a temporary storage tank is 2 m$^3$, with total $\alpha$=0.276 Bq/L, and total $\beta$=1000 Bq/L;
2) ion exchange: the wastewater successively flows through I-level and II-level ion exchange adsorbers (two-level serial connection mode) through a peristaltic pump at a flow rate of 400 L/h, and a single adsorber is filled with 35 kg of weak alkaline ion exchange fiber;
3) radioactivity monitoring: a radioactivity concentration of purified liquid is measured; and
4) discharge up to standards: the radioactivity level of the purified liquid meets an emission standard limit specified in China, and actual values include total $\alpha$=0.019 Bq/L and total $\beta$=0.659 Bq/L.

For this embodiment, the treatment cycle is 5 h.

Comparative example: for nuclear medical radioactive wastewater with total α=0.276 Bq/L, total β=1000 Bq/L, and a volume of 2 m³, a decay pool is used in the prior art for storage, and the wastewater is allowed to be discharged till the storage time is at least 54 days (it is generally necessary to store for 180 days).

Through the comparison of the above two examples, it can be seen that, compared with the prior art, the present disclosure can enable the radioactive wastewater to meet the minimization requirements of wastewater while performing rapid deep purification treatment on the radioactive wastewater, effectively improve the wastewater treatment efficiency and the treatment capacity and meet the number of diagnosis and treatment in the nuclear medicine department, and also ensure that the radioactivity level of a nuclear medical radioactive wastewater discharge port meets the requirements of sewage discharge limit standards, and the wastewater is discharged to a conventional wastewater pipe network in the hospital in a timely manner.

Embodiment 3

An ion exchange fiber adsorbent material in the ion exchange adsorbers at all levels in the present disclosure can select any one of the following materials according to actual needs:

material 1: a quaternary ammonium type ion exchange fiber (selected among many existing materials, as a preferred example of the present disclosure relative to the existing materials):

a preparation process of the quaternary ammonium type ion exchange fiber includes: preparation of a matrix fiber, grafting of a polypropylene fiber with styrene, as well as chloromethylation and amination of the grafted fiber, and specifically, may be subdivided from the following four steps:

step 1: melt spinning of polypropylene masterbatch to obtain the polypropylene fiber: the spun fiber was soaked in an acetone solvent, an organic solvent was removed after 24 h, and the fiber was washed with distilled water, then subjected to ultrasonic cleaning, and dried at 60° C. to obtain the polypropylene fiber;

step 2: grafting reaction: the polypropylene fiber was swollen in dichloroethane first, then immersed in a styrene grafting solution, heated to 70-120° C., and grafted under this temperature, wherein the preferred temperature was 90° C., and the grafting time was 3-8 h, most preferably, 6 h; and a grafted fiber with a certain grafting rate can be obtained at the end of reaction;

step 3: chloromethylation: an appropriate amount of zinc chloride catalyst (a weight ratio of a catalyst to a fiber is 1:1) was added to a certain volume of chloromethyl ether and allowed to stand at room temperature for 0.5 h, such that zinc chloride can be partially dissolved; a certain amount of grafted styrene fiber was then added, fully immersed in a chloromethyl ether solution, and allowed to stand at room temperature for 0.5 h, and then a reactor was put into a water bath and slowly heated to 30-80° C., wherein the preferred temperature was 50° C., the reaction time was 8-13 h, and the preferred time was 10 h; stirring was performed every 1 h to ensure that the reaction was more uniform and sufficient; and step 4: quaternarization reaction. the fiber subjected to the chloromethylation reaction was put into a trimethylamine aqueous solution (a molar ratio of the fiber to trimethylamine was 1:1.05), and reacted at a temperature of 20-40° C. for 12-16 h, wherein the preferred temperature was 30° C. and the preferred time was 14 h; during the reaction, stirring should be done every 1 h to ensure the sufficiency and uniformity of the reaction.

Material 2: biquaternary ammonium cationic type ion exchange fiber

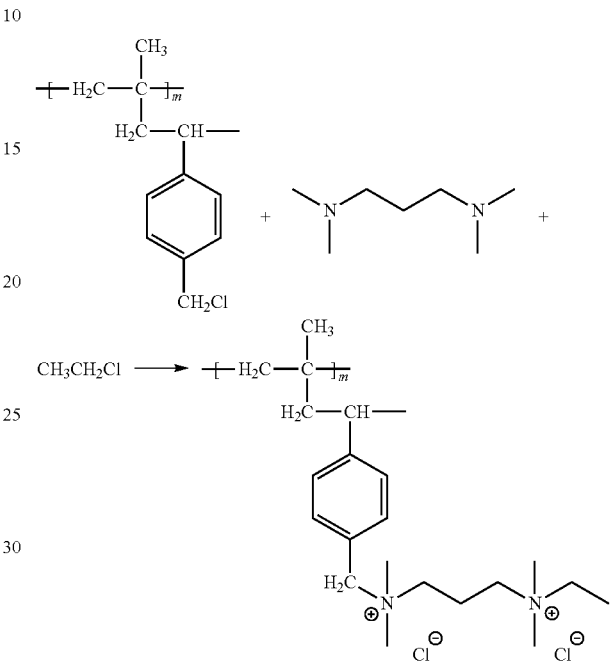

A quaternary ammonium type ion exchange fiber material in this example was redesigned according to actual application scenarios and application needs of the present disclosure, and its preparation process included four steps: preparation of a matrix fiber, grafting of a polypropylene fiber with styrene, as well as chloromethylation and amination of the grafted fiber, and specifically, may be subdivided from the following four steps:

step 1: polypropylene masterbatch was melt-spun first, the spun fiber was soaked in an acetone solvent, an organic solvent was removed after 24 h, and the fiber was washed with distilled water, then subjected to ultrasonic cleaning, and dried at 60° C. to obtain a polypropylene fiber;

step 2: grafting reaction: the polypropylene fiber was swollen in dichloroethane first, then immersed in a styrene grafting solution, heated to 70-120° C., and grafted under this temperature, wherein the preferred temperature was 90° C., and the grafting time was 3-8 h, most preferably, 6 h; and a grafted fiber with a certain grafting rate can be obtained at the end of reaction;

step 3: chloromethylation: an appropriate amount of zinc chloride catalyst (a weight ratio of a catalyst to a fiber is 1:1) was added to a certain volume of chloromethyl ether and allowed to stand at room temperature for 0.5 h, such that zinc chloride can be partially dissolved; a certain amount of grafted styrene fiber was then added, fully immersed in a chloromethyl ether solution, and allowed to stand at room temperature for 0.5 h, and then a reactor was put into a water bath and slowly heated to 30-80° C., wherein the preferred temperature was 50° C., the reaction time was 8-13 h, and the preferred time was 10 h; stirring was performed every 1 h to ensure that the reaction was more uniform and sufficient; and step 4: quaternarization reaction: firstly, an ethyl bromide solution was added to a tetramethylpropanediamine aqueous solution according to a molar ratio of 1:0.8-1:1.2 (preferably 1:1.05), and reacted at a temperature of 20-40° C. for 12-18 h, wherein the preferred temperature was 30° C., and the preferred time was 16 h; subsequently, the fiber subjected to the chloromethylation reaction (a molar ratio of the fiber to tetramethylpropanediamine was 1:0.8-1:1.2, preferably 1:1.05) was added to the above reaction product, and reacted at a temperature of 20-40° C. for 14-24 h, wherein the preferred temperature was 30° C., and the preferred time was 20 h; during the reaction, stirring should be done every 1 h to ensure the sufficiency and uniformity of the reaction.

Compared with the material 1, the material 2 in this example, due to the introduction of the biquaternary ammonium cation structure, has significantly increased positive charges carried by cations, increased ionic potential of the material, stronger anode attraction center, and further stronger iodine anion attraction capacity. At the same time, in the modified fiber, the number of coordination anions increases, which means that the material has more ion exchange sites per unit molar amount. The introduction of iodine-philic bromide ion group enhances the adsorption performance through halogen bonding, so that the exchange capacity of the fiber material for ions is enhanced.

Material 3: imidazolium cationic functionalized ion exchange fiber

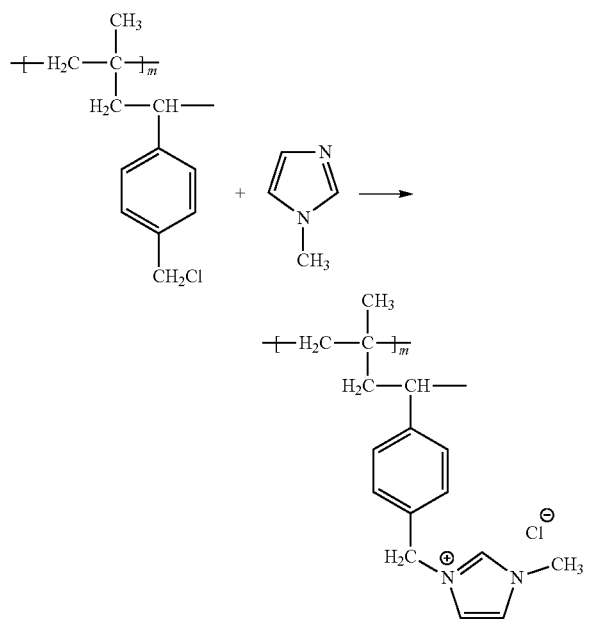

The imidazolium cationic functionalized ion exchange fiber in this example was redesigned according to actual application scenarios and application needs of the present disclosure, and its preparation process included four steps: preparation of a matrix fiber, grafting of a polypropylene fiber with styrene, as well as chloromethylation and amination of the grafted fiber, and specifically, may be subdivided from the following four steps:

step 1: polypropylene masterbatch was melt-spun first, the spun fiber was soaked in an acetone solvent, an organic solvent was removed after 24 h, and the fiber was washed with distilled water, then subjected to ultrasonic cleaning, and dried at 60° C. to obtain a polypropylene fiber;

step 2: grafting reaction: the polypropylene fiber was swollen in dichloroethane first, then immersed in a styrene grafting solution, heated to 70-120° C., and grafted under this temperature, wherein the preferred temperature was 90° C., and the grafting time was 3-8 h, most preferably, 6 h; and a grafted fiber with a certain grafting rate can be obtained at the end of reaction;

step 3: chloromethylation: an appropriate amount of zinc chloride catalyst (a weight ratio of the catalyst to the fiber is 1:1) was added to a certain volume of chloromethyl ether and allowed to stand at room temperature for 0.5 h, such that zinc chloride can be partially dissolved; a certain amount of grafted styrene fiber was then added, fully immersed in a chloromethyl ether solution, and allowed to stand at room temperature for 0.5 h, and then a reactor was put into a water bath and slowly heated to 30-80° C., wherein the preferred temperature was 50° C., the reaction time was 8-13 h, and the preferred time was 10 h; stirring was performed every 1 h to ensure that the reaction was more uniform and sufficient; and step 4: quaternarization reaction: the fiber subjected to the chloromethylation reaction was put into a methylimidazole aqueous solution (a molar ratio of the fiber to trimethylamine was 1:0.8-1:1.2, preferably 1:1.05), and reacted at a temperature of 20-60° C. for 12-16 h, wherein the preferred temperature was 40° C. and the preferred time was 14 h; during the reaction, stirring should be done every 1 h to ensure the sufficiency and uniformity of the reaction.

Compared with the material 1, the material 3 in this example introduced imidazolium cations, which had a five-membered ring π conjugation system and an N heteroatom structure compared with trimethylamine, and exhibited good adsorption of iodine and iodine anions through a cation-π force and a halogen bonding effect generated by N heteroatoms. Therefore, the cation-n force and N heteroatom attraction were introduced into the previous ion exchange mechanism of the material 3, which increased the adsorption capacity of the material to ions.

Material 4: pyridinium cationic functionalized ion exchange fiber

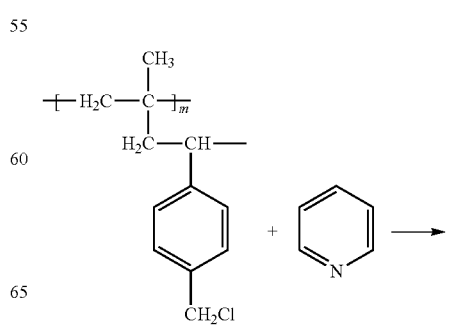

-continued

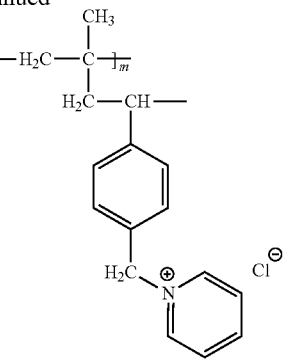

The imidazolium cationic functionalized ion exchange fiber in this example was redesigned according to actual application scenarios and application needs of the present disclosure, and its preparation process included four steps: preparation of a matrix fiber, grafting of a polypropylene fiber with styrene, as well as chloromethylation and amination of the grafted fiber, and specifically, may be subdivided from the following four steps:

step 1: polypropylene masterbatch was melt-spun first, the spun fiber was soaked in an acetone solvent, an organic solvent was removed after 24 h, and the fiber was washed with distilled water, then subjected to ultrasonic cleaning, and dried at 60° C. to obtain a polypropylene fiber;

step 2: grafting reaction: the polypropylene fiber was swollen in dichloroethane first, then immersed in a styrene grafting solution, heated to 70-120° C., and grafted under this temperature, wherein the preferred temperature was 90° C., and the grafting time was 3-8 h, most preferably, 6 h; and a grafted fiber with a certain grafting rate can be obtained at the end of reaction;

step 3: chloromethylation: an appropriate amount of zinc chloride catalyst (a weight ratio of the catalyst to the fiber is 1:1) was added to a certain volume of chloromethyl ether and allowed to stand at room temperature for 0.5 h, such that zinc chloride can be partially dissolved; a certain amount of grafted styrene fiber was then added, fully immersed in a chloromethyl ether solution, and allowed to stand at room temperature for 0.5 h, and then a reactor was put into a water bath and slowly heated to 30-80° C., wherein the preferred temperature was 50° C., the reaction time was 8-13 h, and the preferred time was 10 h; stirring was performed every 1 h to ensure that the reaction was more uniform and sufficient; and step 4: quaternarization reaction: the fiber subjected to the chloromethylation reaction was put into a pyridine aqueous solution (a molar ratio of the fiber to trimethylamine was 1:0.8-1:1.2, preferably 1:1.05), and reacted at a temperature of 30-80° C. for 14-22 h, wherein the preferred temperature was 55° C. and the preferred time was 18 h; during the reaction, stirring should be done every 1 h to ensure the sufficiency and uniformity of the reaction.

Compared with the material 1, the material 4 in this example introduced pyridinium cations, which had a six-membered ring π conjugation system and an N heteroatom structure compared with trimethylamine, and exhibited good adsorption of iodine and iodine anions through a cation-π force and a halogen bonding effect generated by N heteroatoms. Therefore, the cation-π force and N heteroatom attraction were introduced into the previous ion exchange mechanism of the material 4, which increased the adsorption capacity of the material to ions.

Material 5: hydroxyl functionalized quaternary ammonium ion exchange fiber

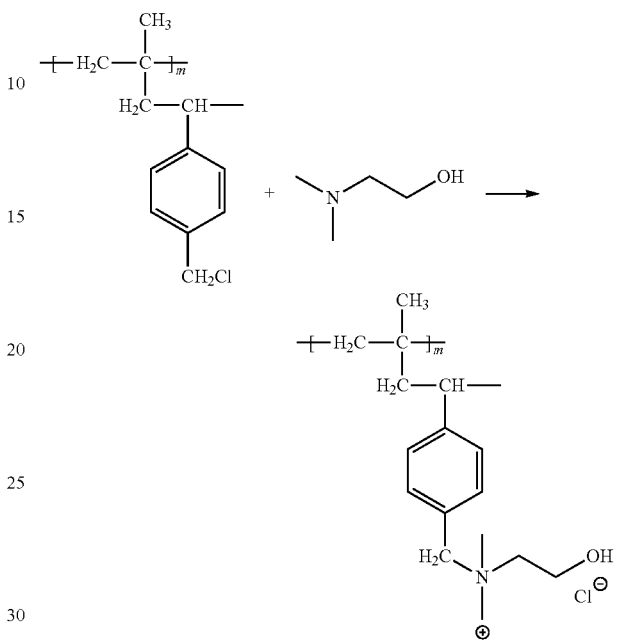

The imidazolium cationic functionalized ion exchange fiber in this example was redesigned according to actual application scenarios and application needs of the present disclosure, and its preparation process included four steps: preparation of a matrix fiber, grafting of a polypropylene fiber with styrene, as well as chloromethylation and amination of the grafted fiber, and specifically, may be subdivided from the following four steps:

step 1: polypropylene masterbatch was melt-spun first, the spun fiber was soaked in an acetone solvent, an organic solvent was removed after 24 h, and the fiber was washed with distilled water, then subjected to ultrasonic cleaning, and dried at 60° C. to obtain a polypropylene fiber;

step 2: grafting reaction: the polypropylene fiber was swollen in dichloroethane first, then immersed in a styrene grafting solution, heated to 70-120° C., and grafted under this temperature, wherein the preferred temperature was 90° C., and the grafting time was 3-8 h, most preferably, 6 h; and a grafted fiber with a certain grafting rate can be obtained at the end of reaction;

step 3: chloromethylation: an appropriate amount of zinc chloride catalyst (a weight ratio of the catalyst to the fiber is 1:1) was added to a certain volume of chloromethyl ether and allowed to stand at room temperature for 0.5 h, such that zinc chloride can be partially dissolved; a certain amount of grafted styrene fiber was then added, fully immersed in a chloromethyl ether solution, and allowed to stand at room temperature for 0.5 h, and then a reactor was put into a water bath and slowly heated to 30-80° C., wherein the preferred temperature was 50° C., the reaction time was 8-13 h, and the preferred time was 10 h; stirring was performed every 1 h to ensure that the reaction was more uniform and sufficient; and step 4: quaternarization reaction: the fiber subjected to the chloromethylation reaction was put into a 2-dimethylaminoethanol aqueous solution (a molar ratio of the fiber to trimethylamine was 1:0.8-1:1.2, preferably 1:1.05), and reacted at a temperature of 20-50° C. for 12-16 h, wherein the preferred temperature was 30° C. and the preferred time was 14 h; during the reaction, stirring should be done every 1 h to ensure the sufficiency and uniformity of the reaction.

Compared with the material 1, the material 5 in this example introduced quaternary ammonium cations with hydroxyl functional groups on the basis of maintaining the original synthetic reactivity, and the increased hydroxyl functional groups can produce strong hydrogen bond interactions with ions to be adsorbed in the aqueous system, thereby increasing the adsorption capacity of the fiber material 5 to ions.

Embodiment 4

Ionic type covalent organic framework adsorbent material: 1. preparation of 1,3,5-triimidazolium cationic type covalent organic framework material:
a 1, 3,5-triimidazolium cationic type covalent organic framework material with high charge density was prepared by triformylbenzyl-imidazole benzyl bromide monomer and biphenylenediamine, and the specific process was as follows: firstly, 1,3,5-tris(imidazolyl) benzene and 4-(bromomethyl)benzaldehyde were prepared by a quaternarization reaction to obtain a tris (formylbenzyl)-imidazobenzyl bromide monomer, that is, 1,3,5-tris(1-imidazolyl)benzene and 4-(bromomethyl)benzaldehyde were added according to a molar ratio of 1:3-1:5 were added to an ethyl acetate solvent, and then stirred at 60-80° C. for 3-5 days. At the end of the reaction, a small amount of acetonitrile was added, and washed alternately with ethyl acetate and methanol, and finally rotatably evaporated to dry, that is, an imidazole ionic type tris(formylbenzyl)-imidazobenzyl bromide monomer was obtained. Subsequently, the obtained imidazolium bromide monomer (0.08 mmol) and biphenyldiamine (0.12 mmol) were dissolved in anhydrous methanol to obtain a solution, and 1.3-2.1 mL of 1, 4-dioxane and 0.1-0.3 mL of acetic acid aqueous solution were added to the solution, wherein acetic acid was used as a catalyst. A tube was sealed and the reaction was allowed to stand at 80-100° C. for 3-7 days. Finally, a solvent was removed by centrifugation, a yellow precipitate was collected, washed with tetrahydrofuran and acetone, and dried in vacuum at 100° C. for 24 h to obtain the 1, 3, 5-triimidazolium cationic type covalent organic framework material with high charge density.

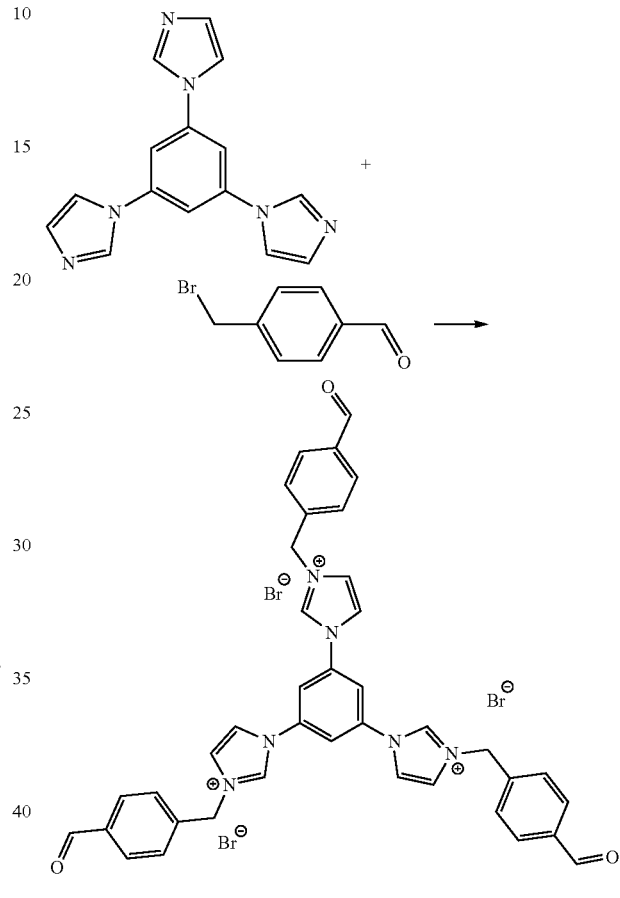

1,3,5-tris(imidazolyl)benzene 4-(bromomethyl)benzaldehyde tris(formylbenzyl)-imidazobenzyl bromide

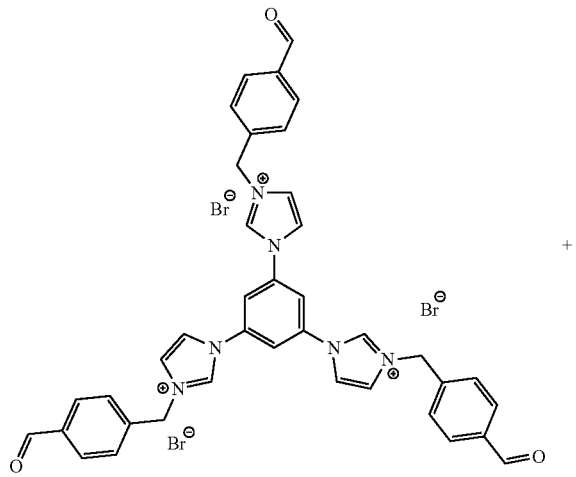

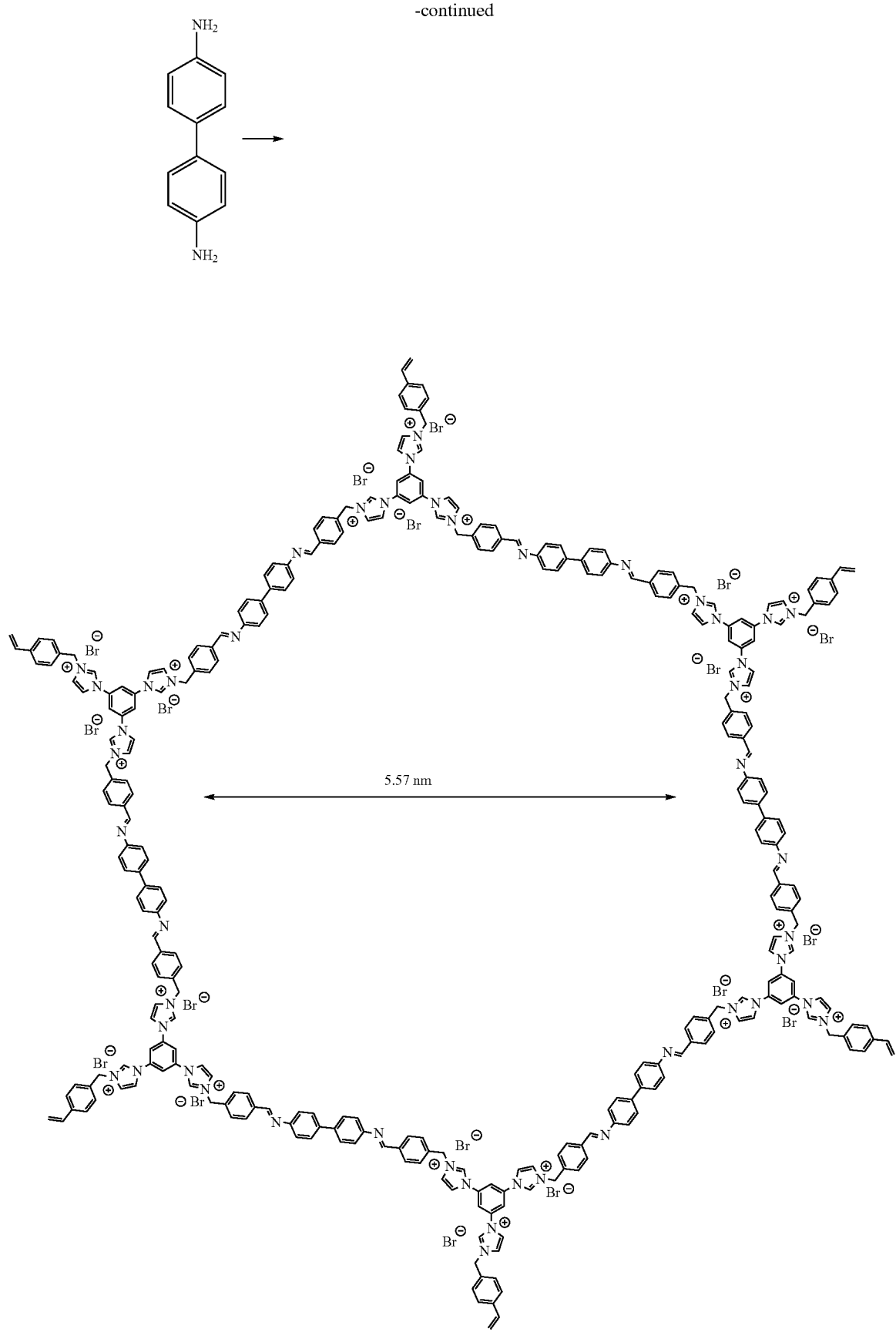

biphenylenediamine 1, 3, 5-triimidazolium cationic type covalent organic framework material with high charge density In order to illustrate the beneficial effect of the ionic type covalent organic framework adsorbent material applied in the treatment of nuclear medical radioactive wastewater in Embodiment 4, the following is supplemented by Embodiment 5:

Embodiment 5

An application method of an integrated rapid treatment system for nuclear medical radioactive wastewater includes the following steps:
1) temporary storage: a volume of nuclear medical radioactive wastewater in a temporary storage tank was 2.5 L, with total $\alpha=1.548$ Bq/L and with total $\beta=620.657$ Bq/L;
2) ion exchange: the wastewater successively flowed through I-level and II-level ion exchange adsorbers (two-level serial connection mode) through a peristaltic pump at a flow rate of 11.7 mL/min, and a single adsorber was filled with 5 g of 1, 3, 5-triimidazolium cationic type covalent organic framework material with high charge density;
3) radioactivity monitoring: a radioactivity concentration of purified liquid was measured; and
4) discharge up to standards: the radioactivity level of the purified liquid meets an emission standard limit specified in China, and actual values include total $\alpha=0.012$ Bq/L and total $\beta=0.396$ Bq/L.

For this embodiment, the treatment cycle was 3.21 h.

Comparative example: for nuclear medical radioactive wastewater with total $\alpha=1.548$ Bq/L, total $\beta=620.657$ Bq/L, and a volume of 2.5 L, a decay pool is used in the prior art for storage, and the wastewater is allowed to be discharged till the storage time is at least 48 days.

Comparison of this covalent organic framework material with existing patents:
the existing patent CN 114736338 A discloses a preparation method and application of a cationic type covalent organic framework material. A neutral covalent organic framework material was prepared by the reaction of two monomers, 2, 5-divinylterephthalaldehyde and 1, 3, 5-tris(4-aminophenyl)benzene, and then a quaternary ammonium salt was grafted inside and outside pores of the material and modified to obtain the cationic type covalent organic framework material. The positively charged part of the prepared material can form a strong electrostatic interaction with iodine ions, thereby achieving adsorption. The shortcomings of the present disclosure are that: the quaternary ammonium cationic structure produced by the grafting in the method has a long alkyl chain, and is grafted inside and outside the pores of the material, whereby the pores of the obtained covalent organic framework material are occupied and blocked, and a specific surface area of the material is reduced. At the same time, iodide ions belong to a larger volume of substances, which leads to the adsorption of iodide ions by external charges of only the covalent organic framework material, thereby greatly reducing the utilization rate of the material, seriously affecting the contact between iodide ions and active sites in the pores, and then affecting the iodine ion adsorption performance of the framework material. The imidazolyl cationic type covalent organic framework material of the present disclosure increases the cationic charges on a framework skeleton, significantly increases the charge density, and has a stronger electrostatic attraction ability on the one hand; and on the other hand, retains the pores of the material well while retaining the positive charge characteristics of the skeleton, thereby increasing the diffusion and timely capture of various ions.

The existing patent CN 115155526B discloses a preparation method of a fullerene covalent organic framework material for the treatment of nuclear wastewater. Magnetic fullerene carbon/aerogel prepared from oxidized fullerene, hydroquinone and formaldehyde was combined with a covalent organic framework formed by p-phenylenediamine and benzenetricarboxaldehyde for grafting. This material may be applied to the adsorption of radioactive elements in a water environment, which can achieve a good removal effect. As mentioned in the present disclosure, the covalent organic framework is a material with a high specific surface area, porosity, and adsorption functional groups. The shortcomings of the present disclosure are that: 1. concentrated nitric acid and concentrated sulfuric acid substances are used in the preparation process, and a large amount of strong acidic waste liquid will be produced, which is easy to cause secondary environmental pollution. 2. The obtained framework material is mainly adsorbed by pore adsorption, and then combined with some heteroatoms to achieve adsorption. On the basis of these forces, the disclosure patent further introduces strong electrostatic attraction and halogen bonding, and has a stronger targeted ion adsorption capacity. At the same time, the synthesis of the frame material in the present disclosure will not produce a highly acidic waste liquid, which is environmentally friendly.

The above scheme is just a preferred example, but is not limited to this. In the implementation of the present disclosure, appropriate substitutions and/or modifications may be made according to the needs of the user.

The number of equipment and the processing scale described herein are used to simplify the description of the present disclosure. The application, modifications and variations of the present disclosure are obvious to those skilled in the art.

Although the embodiments of the present disclosure have been disclosed as above, they are not limited to the applications listed in the description and embodiments. They can be fully applied to various fields suitable for the present disclosure. For those skilled in the art, additional modifications can be easily implemented. Accordingly, without departing from the general concept defined by the claims and equivalent scopes, the present disclosure is not limited to specific details and the legends shown and described herein.

What is claimed is:

1. An integrated rapid treatment system for nuclear medical radioactive wastewater, comprising:
   a wastewater collection unit for receiving and temporarily storing wastewater from clinical practice in nuclear medicine;
   a pretreatment unit for performing solid-liquid separation on wastewater outputted from a wastewater collection pool;
   a deep purification unit for performing multi-level nuclide extraction and separation on clear liquid outputted from the pretreatment unit;
   a solid decay unit for performing natural decay on solid impurities outputted from the pretreatment unit over time;
   a buffer unit for temporarily storing decayed clear liquid;

an online detection unit matching the respective units; and
a control unit connected in communication with the online detection unit to switch working states of the respective units, wherein
the online detection unit comprises: a radioactivity level detection module for detecting total α and total β radioactivity concentrations of a medium in each unit, and a process parameter monitoring module for detecting key process parameters of the treatment process in real time;
the solid decay unit is configured to include a plurality of decay pools that is poured by concrete and is independent of each other;
each decay pool is communicated with a buffer pool through a matching pipeline VII, and each decay pool receives and temporarily stores solid impurities generated by the pretreatment unit according to a chronological production order of the solid impurities, respectively;
the deep purification unit is configured to include a plurality of independent nuclide extraction and separation modules in a serial connection arrangement;
the outside of each nuclide extraction and separation module is covered with a radiation protection layer in a detachable manner, and the nuclide extraction and separation module located at the tail end is communicated with the buffer pool through a matching pipeline V;
the nuclide extraction and separation module at the lower level is communicated with the nuclide extraction and separation module at the upper level through a matching pipeline VI to form a self-circulation path of the deep purification unit;
the nuclide extraction and separation module is an ion exchange adsorber, and an ion exchange fiber adsorbent material in the ion exchange adsorbers at all levels adopts the following biquaternary ammonium cationic type ion exchange fiber:

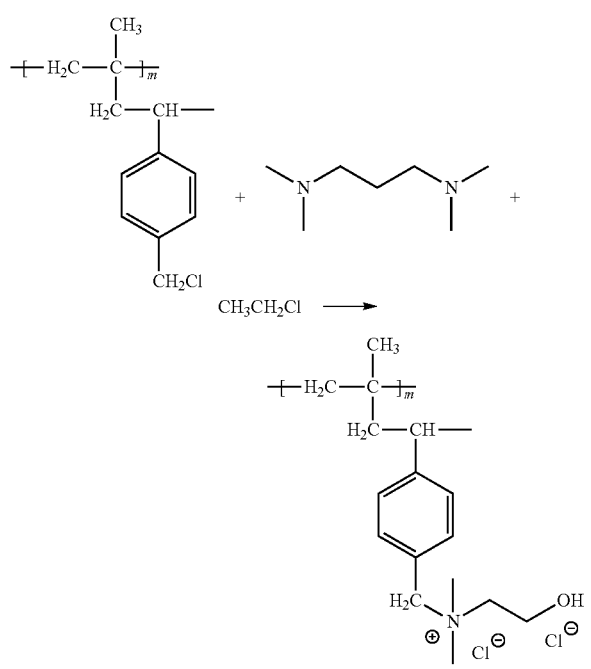

a preparation process of the biquaternary ammonium cationic type ion exchange fiber comprises:
step 1: performing melt spinning on polypropylene masterbatch, soaking the spun fiber in an acetone solvent, removing an organic solvent after 24 h, washing with distilled water, then performing ultrasonic cleaning, and drying at 60° C. to obtain a polypropylene fiber;
step 2: performing a grafting reaction: swelling the polypropylene fiber in dichloroethane, then immersing in a styrene grafting solution, heating to a temperature of 70-120° C. and grafting for 3-8 h, thereby obtaining a grafted fiber with a predetermined grafting rate at the end of the reaction;
step 3: performing chloromethylation: first adding a zinc chloride catalyst to a predetermined volume of chloromethyl ether and ensuring that a weight ratio of a catalyst to a fiber is 1:1; standing at room temperature for 0.5 h, so that zinc chloride can be partially dissolved; then adding a certain amount of grafted styrene fiber, so that the fiber is fully immersed in a chloromethyl ether solution; then standing at room temperature for 0.5 h; then putting a reactor into a water bath and slowly heating to 30-80° C.; reacting for 8-13 h, and stirring every 1 h, to ensure that the reaction is more uniform and sufficient; and
step 4: performing a quaternarization reaction: first adding an ethyl bromide solution in a tetramethylpropanediamine aqueous solution according to a molar ratio of 1:0.8-1:1.2, reacting at a temperature of 20-40° C. for 12-18 h, and then adding the fiber subjected to the chloromethylation reaction in the reaction product, wherein a molar ratio of the fiber to tetramethylpropanediamine is 1:0.8-1:1.2; and reacting at a temperature of 20-40° C. for 14-24 h, and stirring every 1 h during the reaction process to ensure the sufficiency and uniformity of the reaction.

2. The integrated rapid treatment system for the nuclear medical radioactive wastewater according to claim 1, wherein the wastewater collection unit is configured to include a wastewater collection pool poured by concrete;
the wastewater collection pool is communicated with an inlet end of the pretreatment unit through a matching pipeline I.

3. The integrated rapid treatment system for the nuclear medical radioactive wastewater according to claim 2, wherein the pretreatment unit is configured to include a solid-liquid separation module welded by stainless steel; and
a pretreatment assembly I and a pretreatment assembly II, which are connected in parallel and/or series with a solid-liquid separation module through a pipeline II and a pipeline III;
the pretreatment assembly I comprises a sand filter module and a carbon adsorption module which are connected in series, and the pretreatment assembly II comprises a microfiltration module and an ultrafiltration module which are connected in series;
the solid-liquid separation module, the ultrafiltration module and the carbon adsorption module are respectively communicated with the solid decay unit and the deep purification unit through a pipeline IV, a pipeline V and a pipeline VI which are matched with each other; and
the online detection unit further comprises:
a particle detection module which is arranged on an output side of the solid-liquid separation module and used for detecting particle sizes of suspended solids in wastewater subjected to solid-liquid separation.

4. The integrated rapid treatment system for the nuclear medical radioactive wastewater according to claim 1, wherein the control unit is configured to comprise an input module, a communication module, a control module, an execution module, a display module and an alarm module; and the execution module is configured to comprise valves, pumps and selection switches, which are arranged on connecting pipelines of the respective units.

5. The integrated rapid treatment system for the nuclear medical radioactive wastewater according to claim 1, wherein the buffer unit is configured to include a buffer pool I, a buffer pool II and a buffer pool III which have the same volume and are connected in parallel.

6. An application method of the integrated rapid treatment system for the nuclear medical radioactive wastewater according to claim 1, comprising:

step 1: the control unit receiving various control parameters inputted by a user, and controlling working states of the respective units based on the control parameters;

step 2: the online detection unit detecting total α and total β radioactivity concentrations of the pretreatment unit and the deep purification unit and related process parameters in real time, and controlling parameters applied in the processes, equipment and formulas of the pretreatment unit and the deep purification unit according to the detection results;

the online detection unit detecting a solid impurity storage capacity and radioactivity level of each solid decay pool in the solid decay unit in real time, and feeding back to the control unit, and the control unit controlling a working state of the execution module on each solid decay pool based on the detection results; and the online detection unit detecting a storage capacity and radioactivity level of the buffer unit in real time, and feeding back to the control unit, and the control unit controlling a working state of an execution module on the buffer unit based on the detection results.

7. The application method of the integrated rapid treatment system for the nuclear medical radioactive wastewater according to claim 6, wherein in step 2, the online detection unit detects total α and total β radioactivity concentrations of an effluent of the tail nuclide extraction and separation module of the deep purification unit, and determines whether the radioactivity level of the effluent is lower than a limit of the national standard; if the radioactivity level of the effluent is lower than the limit of the national standard, the execution module corresponding to the deep purification unit is activated, and the effluent is discharged to the buffer pool I of the buffer unit for temporary storage;

otherwise, the execution module on the self-circulation path is activated according to the radioactivity level, and the effluent is conveyed to the corresponding nuclide extraction and separation module at the upper level for secondary processing.

8. The application method of the integrated rapid treatment system for the nuclear medical radioactive wastewater according to claim 6, wherein, in step 2, when the buffer pool I of the buffer unit is in a full state, the control unit switches a working state of a pipeline at an input end of the buffer pool I to a closed state, and a working state of a pipeline at an input end of the buffer pool II to an opened state;

whether the solid and liquid in the buffer pool I meet discharge standards is detected by a third-party detection institution; if the detection result meets the discharge standards, the control unit switches a pipeline at an output end of the buffer pool I to an opened state for discharge; after the buffer pool I is emptied and the buffer pool II is full, the control unit switches the working state of the pipeline at the input end of the buffer pool II to a closed state, and switches the working state of the pipeline at the input end of the buffer pool I to an opened state;

otherwise, a working state of a pipeline at an input end of the buffer pool III is switched to an opened state, a working state of a connecting pipeline between the buffer pool I and the pretreatment unit is switched simultaneously, and the solid and liquid in the buffer tank I are subjected to secondary treatment.

* * * * *